United States Patent Office 2,749,225
Patented June 5, 1956

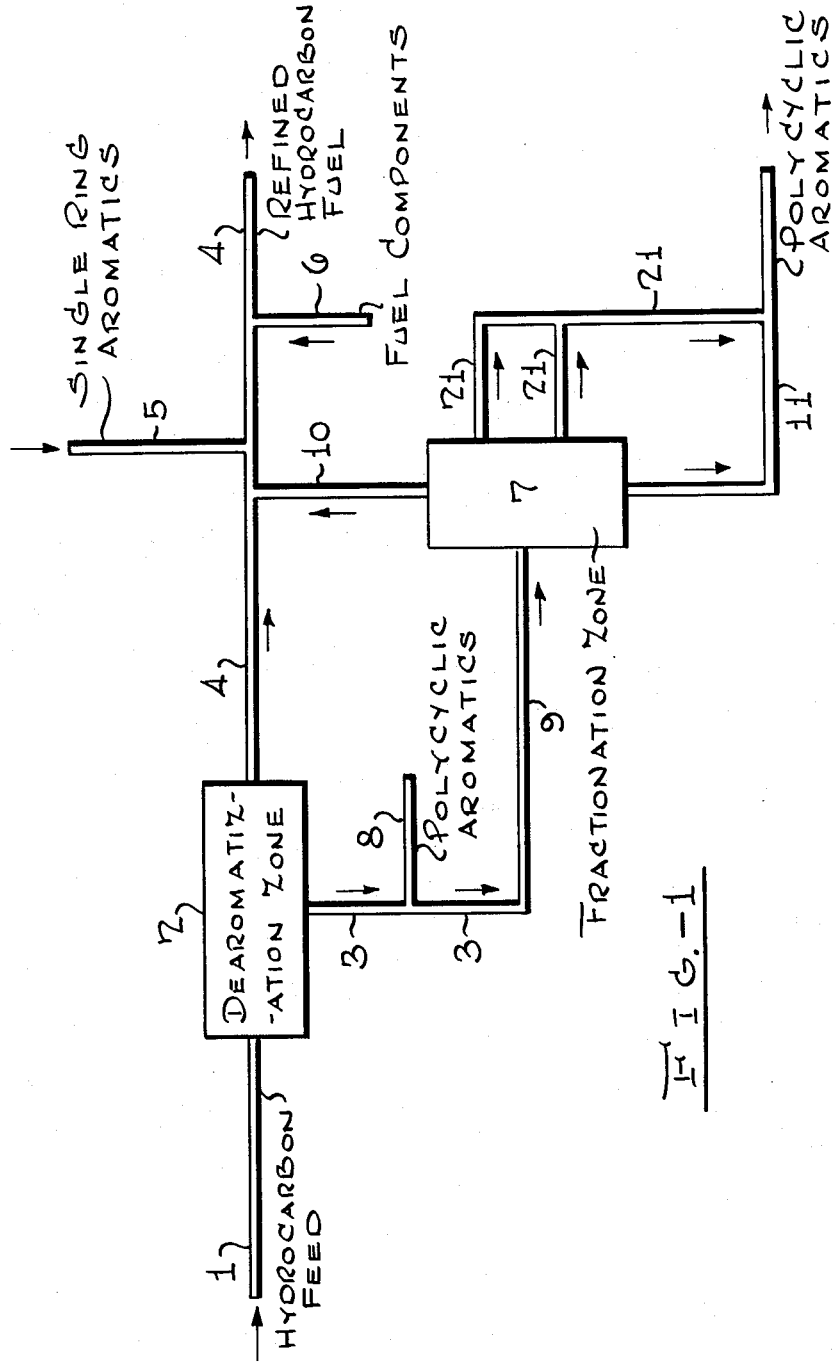

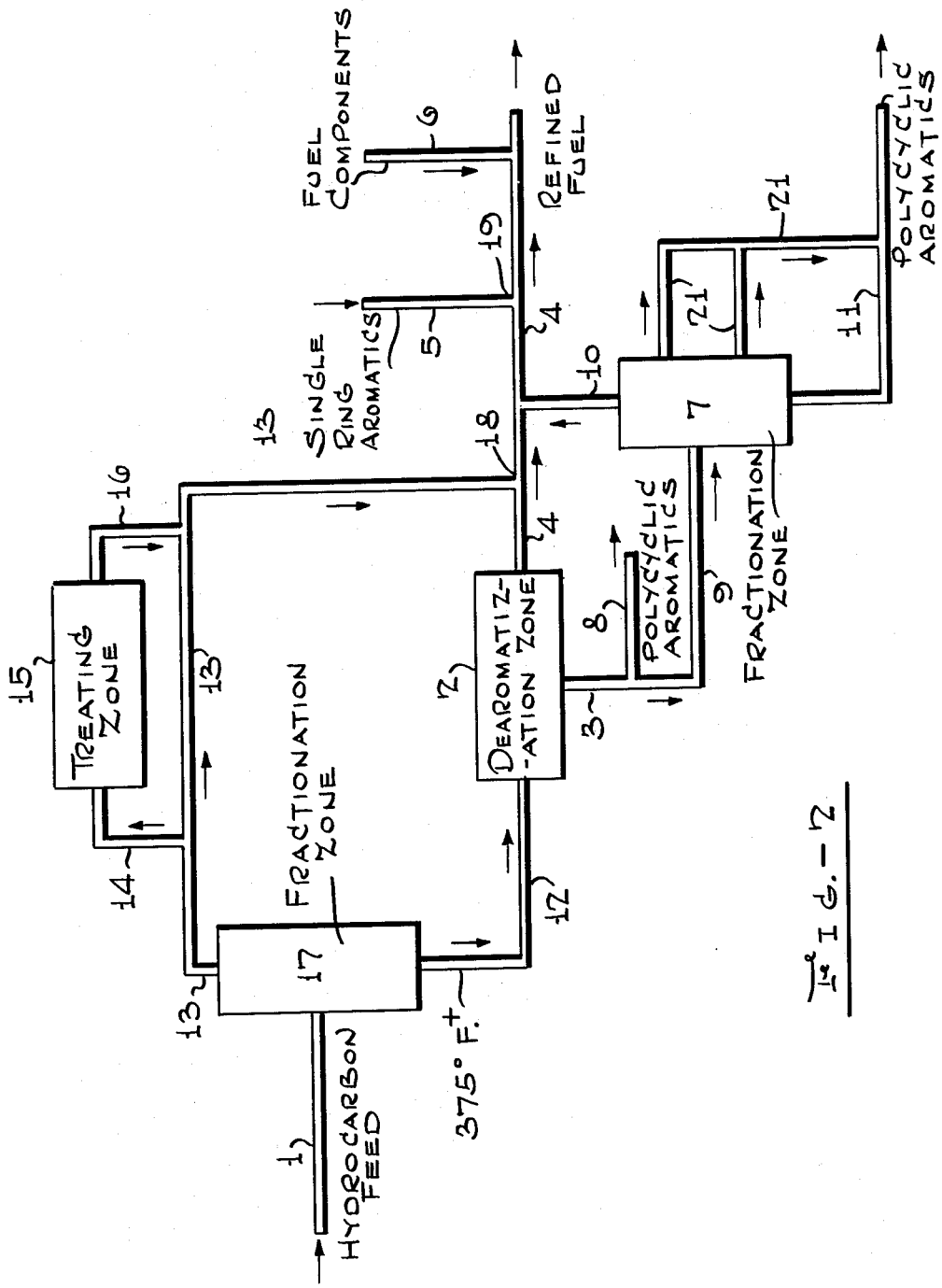

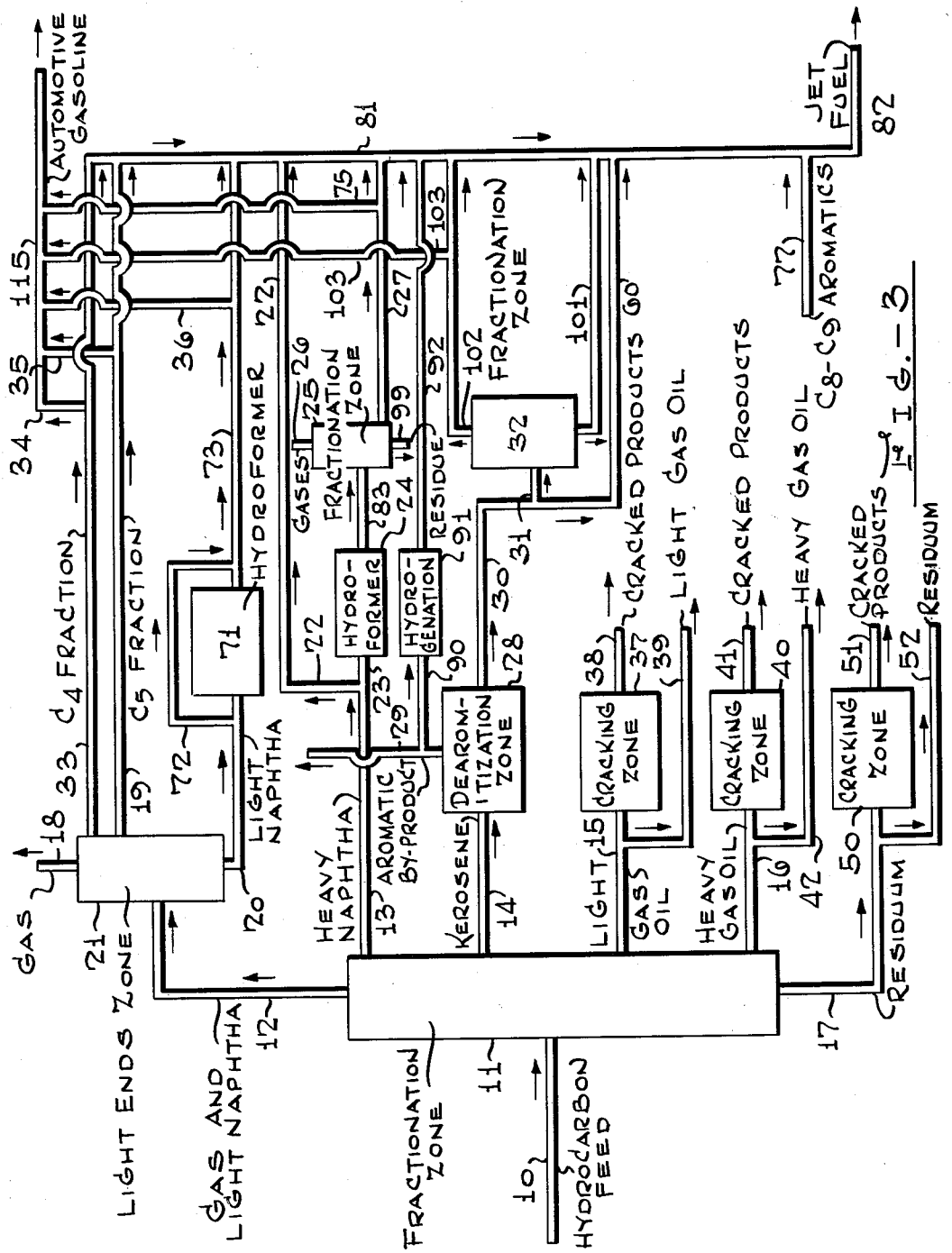

2,749,225
PROCESS FOR PRODUCING A HYDROCARBON FUEL

Robert E. Barnum, Roselle, George N. Jenkins, Elizabeth, and Theodore B. Wasserbach, Cranford, N. J., assignors to Esso Research and Engineering Company, a corporation of Delaware Application April 29, 1952, Serial No. 285,012

9 Claims. (Cl. 52—.5)

This invention concerns improved fuels for use in spark ignition internal combustion engines such as automotive engines and in jet engines. It is concerned particularly with the production of fuels that have markedly improved engine cleanliness characteristics, and further, with the production of fuels that have reduced tendencies toward fuel filter plugging.

In the operation of both internal combustion engines and jet engines, a serious problem existing at the present time is the formation of engine deposits. In both cases, fuels have an important part in the formation of the deposits. A further problem that arises particularly in the case of jet fuels is the plugging of fuel filters at low temperatures, and this too is dependent on fuel composition.

It is an object of the present invention to produce clean fuels that give very slight engine deposits. It is a further object to provide clean fuels of specification grade in maximum quantity. An additional object is to provide a process for the production of clean fuels that exhibit substantially improved characteristics as regards filter plugging at low temperatures. More specific objects will appear in the following description.

In automotive engines there are formed undesirable deposits of three basic types: (1) sludge, (2) varnish, and (3) combustion chamber deposits. All of these types have deleterious effects on an automotive engine. They not only depreciate the performance of such an engine, but may also greatly shorten its effective life. A great amount of work has been done in studying these deposits, but relatively little progress has been made as yet in determining the nature of these deposits or the mechanisms by which they are formed. Chemical analyses reveal that they are made up of complex compounds of sulfur, carbon, oxygen, nitrogen, lead, etc., but it has not been determined as yet just what roles each of these constituents plays.

Sludge deposits manifest themselves in the crankcase and lubricating oil system of an automotive engine. These deposits impede proper lubrication of an engine by plugging oil lines and filters and thereby greatly increasing engine wear. Occasionally these deposits may build up to such an extent that they actually cause engine failure.

Varnish deposits occur primarily on the cylinder walls, valve stems, and skirts of an automotive engine. They derive their name from the fact that they strongly resemble a varnish or lacquer in appearance. As with sludge deposits, varnish deposits are harmful in that they seriously interfere with proper engine lubrication and thereby increase engine wear.

Combustion chamber deposits form within the combustion chambers of an automotive engine, on the cylinder head and walls and on the valves and piston heads. Generally speaking, the deposits are hard and scaly in structure and adhere tightly to the surfaces named. They possess the very undesirable property of raising the octane number requirement of an automotive engine. By definition the octane number requirement of an engine is the octane number of that grade of gasoline which is at the threshold of knocking when used under limiting conditions in the engine. It has been established that the octane number requirement of an automotive engine can be increased by as much as 10 or 20 octane numbers in an operating life of 15,000 to 20,000 miles by the gradual accumulation of these deposits.

With the advent of spark-ignition engines employing higher and higher compression ratios, it has become imperative that gasolines of high octane number be readily available. It is further imperative that these fuels form as few deposits as possible in an engine, inasmuch as the octane number requirement of an engine, as well as engine wear, increases with increasing amounts of deposits. The present invention helps greatly in the solution of these problems by producing gasolines of high antiknock quality and low deposit forming tendencies.

The engine deposit problem in the case of automotive fuels is paralleled by the combustor deposit problem that exists in the field of jet fuels. Carbonaceous deposits in the combustors of a jet engine are very undesirable in that they disrupt the desired fuel spray patterns in the combustors, cause warping of the liners, and thereby reduce the amount of power that can be generated.

The military interests have set up a number of jet fuel specifications in which an effort has been made to define fuels that minimize deposit formation and other difficulties that have been encountered in the operation of jet aircraft. Specifications for three such fuel types are given in Table 1.

Table 1

COMPARISON OF JP-1, JP-3, AND JP-4 TURBO-FUEL SPECIFICATIONS

|  | MIL-F-5616 | MIL-F-5624A | |
| --- | --- | --- | --- |
|  | JP-1 | JP-3 | JP-4 |
| Reid Vapor Pressure_____lim__ |  | 5-7 | 2-3 |
| ASTM Distillation: |  |  |  |
| 10% Evap. at °F_____max__ | 410 |  | 250 |
| 90% Evap. at °F_____lim__ | <490 | >400 |  |
| Final Boiling Pt., °F_____max__ | 572 | 600 | 550 |
| Distillation Loss, Vol. percent max__ | 1.5 | 1.5 | 1.5 |
| Total Sulfur, Wt. Percent_____max__ | 0.2 | 0.4 | 0.4 |
| Mercaptan Sulfur, Wt. Percent max__ |  | 0.005 | 0.005 |
| Aromatics, Vol. Percent (VV-L-791) max__ | 20 | 25 | 25 |
| Bromine No., cg./gm. (VV-L-791) max__ | 3 | 30 | 30 |
| Freezing Point, °F_____max__ | -76 | -76 | -76 |
| Air Jet Residue (VV-L-791): |  |  |  |
| Bath Temp., °F_____lim__ | 390-410 | 390-410 | 390-410 |
| Mgs. Resid. Per 100 ml_____max__ | 5 | 10 | 10 |
| Corrosion, 3 Hrs. at 212° F_____max__ | (¹) | (¹) | (¹) |
| 16 Hr. Accel. Gum Test: |  |  |  |
| Gum, mg./100 ml_____max__ | 8 | 20 | 20 |
| Water Tolerance, ml_____max__ | 2 | 1 | 1 |
| Net Heat, B.t.u./lb_____min__ |  | 18,400 | 18,400 |
| Gravity, °API_____lim__ | >35 | 45-63 | 40-58 |

¹ None, sl. discoloration only.

It will be noted in Table 1 that the volume of aromatics permitted in each of the fuel types is limited. This limitation is based on the concept that aromatic hydrocarbons in general are the primary cause for the formation of carbon deposits in jet engine combustors. The initial boiling-point of JP-1 turbo-fuel is about 335° F.

It will be noted also that the jet fuel specifications in Table 1 require that the fuels have low freezing points in order that they will not plug the filters. The fuel filters employed in the fuel systems of jet engines have been found to plug for two reasons. First under the low temperature conditions existing at high altitudes jet fuels themselves may freeze, in the sense that a solid phase appears in the liquid, due to the presence of certain hydrocarbon constituents that have undesirably high freezing points. Second, filter plugging may also occur at low temperatures due to the crystallization of small amounts of water dissolved in these fuels. It will be noted in the jet fuel specifications given in Table 1 that an effort has been made to combat the first of these tendencies by stipulating that these fuels must have freezing points lower than −76° F. It will further be noted that no specification exists at the present time with regard to the formation of ice within jet fuels.

It has now been found that condensed ring aromatic hydrocarbons, and particularly alkyl naphthalenes, when present in a gasoline contribute largely toward the formation of sludge, varnish, and combustion chamber and combustor deposits; and it is an object of the present invention to produce fuels containing limited amounts of such aromatics. It is an additional object of the present invention, however, to include certain single-ring aromatic hydrocarbons in the fuels, since these hydrocarbons as a class possess excellent anti-knock quality.

It is an object of the present invention to produce jet fuels that will not only meet all of the existing specifications, but will also dispose of the ice formation problem. Specifically, with the present invention, it is possible to produce jet fuels of any desired boiling range having freezing points lower than −76° F., containing the maximum allowable percentage of aromatics and manifesting no fuel filter plugging tendency resulting from the crystallization of dissolved water. The exact manner in which these objectives can be attained will be stated below.

It has now been found after extensive research that single ring aromatics are not objectionable from the deposit standpoint and can even be employed to advantage in fuels. Further, it has been determined that the predominant deposit forming constituents in both automotive and jet fuels are the condensed ring aromatics such as those of the alkyl-naphthalene type. It has also been found that certain alkylated, single ring aromatics, notably the $C_8$ and $C_9$ aromatics, are particularly beneficial in fuels, in that they greatly reduce the tendencies of the fuels to plug fuel filters at low temperatures. It will be appreciated that the discovery that more single ring aromatics can be included in fuels augments to a great extent the quantities of these fuels that can be produced. It will also be appreciated that the quality of the fuels, particularly in the anti-knocking characteristics of automotive fuels and in the anti-icing tendencies of jet fuels, is greatly increased. These goals have been achieved by the discovery that single ring aromatics can be used to advantage providing condensed ring aromatics are present in critically limited amounts.

Specifically, it has been determined that single ring aromatics boiling within the boiling range of any given gasoline or jet fuel may be incorporated in such a fuel without encountering a deposit problem. Concurrently it has also been found that the amount of polycyclic aromatics in such a fuel must be kept less than about 5% by volume of the fuel and preferably less than 2%. In the case of JP-3 and JP-4 type fuels it has been determined that less than 3% and preferably less than about 1% of polycyclic aromatics be present.

EXAMPLE I

Laboratory and engine studies were conducted to establish the fact that polycyclic aromatic hydrocarbons and heterocyclic compounds are undesirable constituents in an automotive gasoline, in that they form deposits in an automotive engine. This fact was proved in several ways.

First, a catalytically cracked, heavy naphtha was obtained by fractional distillation at 175° to 470° F. vapor temperature of a stabilized high-pressure distillate from a catalytic cracking unit. The naphtha was washed with a 50/50 mixture of 48 Bé. sodium hydroxide and methyl alcohol to remove "acid oil" and then treated with maleic anhydride to remove conjugated diolefins which are known deposit formers. The treated naphtha was then percolated through silica gel to fractionate the naphtha into its general compound types. This procedure is well known in the art, and while it may allow some overlapping, it is a highly useful method of approximately segregating and identifying hydrocarbon types in a naphtha. The various fractions of the naphtha segregated in this manner were evaluated as to their deposit forming tendencies by means of the Deposit Prediction Method described in the patent application Serial Number 213,457 of F. L. Jonach et al., filed March 1, 1951, now Patent No. 2,644,330. The feed to the catalytic cracker was a heavy gas oil having 23.4 API gravity, 177° F. aniline point, 1.3% sulfur content, and equivalent atmospheric boiling points of 542° F. initial, 888° F. mid, and 1200° final. The fractions thus isolated, as well as their engine cleanliness quality, are given in Table 2.

Table 2

CONTRIBUTION OF COMPOUND TYPES TO DEPOSIT FORMATION

[Feed to Silica Gel: Caustic-alcohol washed, maleic anhydride treated; cat. cracked naphtha (approx. 175/470° F. V. T.)]

| Classification of Fraction | Percent of Total Naphtha | Deposit Formation, Percent of Reference [1] |
| --- | --- | --- |
| Paraffin-naphthene | 25 | 55 |
| Olefin | 25 | 55 |
| Aromatic, chiefly mono-cyclic | 34 | 335 |
| Aromatic, Bicyclic Aromatic and Heterocyclic | 16 | 900 |

[1] Compared to the amount of deposits given by a reference gasoline

It is readily apparent from Table 2 that bicycle aromatics and heterocyclic compounds are very undesirable from a cleanliness standpoint in automotive fuels.

The 16% fraction of the naphtha containing the bicyclic aromatics was subsequently separated into small fractions by analytical distillation, and the basic compounds present therein were identified to the extent possible, using infrared, ultraviolet and mass spectroscopic techniques. The principal polycyclic compounds identified in this work were naphthalene, alphamethyl naphthalene, beta-methyl naphthalene, various sulfur-containing and oxygen-containing compounds. Naphthalene and the methyl naphthalenes constituted a little more than 15 volume per cent of the aromatic-bycyclic aromatic-heterocyclic fraction—i. e. the 16% fraction of the naphtha.

The presence of heterocyclic compounds in appreciable concentration in the 16% fraction of the naphtha is indicated by ultimate analysis showing the presence of 1% sulfur and possibly as much as .5% oxygen and .1% nitrogen. Identification of these compounds has been hampered because of the limited infrared and ultraviolet absorption data available on pure compounds in the boiling range in question.

The engine cleanliness quality of various pure polycyclic aromatic and heterocyclic compounds was determined by means of the deposit prediction method (DPM) described above, and in some instances by combustion in an actual automotive engine operated according to the well known CRC–FL–2 Engine Test procedure. In making these tests, the compounds were in solution in a gasoline of high cleanliness quality, and the results were calculated to a 100% basis. The engine cleanliness quality of each of these pure compounds is given in the following table:

*Table 3*

CONTRIBUTION OF PURE COMPOUNDS TO DEPOSIT FORMATION

| Compound | Boiling Pt., °F. | Deposit Formation, Percent of Reference [3] |
|---|---|---|
| Thiophene [1,2] | 183 | 30,000 (DPM). |
| Vinylcyclohexene [2] | 266, 291 | 3,000 (FL-2). |
| Dicyclopentadiene [2] | 338 | 1,300 (FL-2). |
| αMethylnaphthalene [1] | 467 | 1,200 (DPM). |
| Indene [1,2] | 360 | 1,000 (FL-2). |
| Divinylbenzene/Ethylvinylbenzene | 392, 372 | 900 (FL-2). |
| βMethylnaphthalene | 467 | About 600 (DPM). |
| Naphthalene [1] | 424 | 300 (DPM). |

[1] Identified in catalytic naphthas.
[2] Identified in thermal naphthas.
[3] Compared to the amount of deposits given by a reference gasoline of average quality.

It will be noted that while thiophene itself does not appear to be present in the 16% fraction of the catalytic naphtha described earlier, thiophene homologs may very well be present. In any event, the results tabulated in the Tables 2 and 3 definitely establish that the present invention, by removing polycyclic aromatics and heterocyclic compounds from a gasoline, serves a very valuable purpose.

Naphthalene homologs boil above 424° F. In the operation of the cat-cracker for obtaining the naphtha of Table 2, the total distillate boiling above 330° F. had 26 vol. percent between 330° F. and 470° F. The fraction boiling between 430° F. and 470° F. was 3% by volume and in the FL-2 engine test it rated 460% of reference, whereas the fraction boiling between 330° F. and 400° F. rated about 120% of reference. By reference to Table 3, it may be seen that the high per cent of reference for the 430° F. to 470° F. fraction is indicative of the presence of a large proportion of naphthalene homologs.

EXAMPLE II

The effect of condensed ring aromatics, as compared to single ring aromatics, on the carbon deposition properties of a jet fuel in full scale jet engines as well as in single jet engine combustors is shown in Table 4.

*Table 4*

EFFECT OF AROMATICS IN JET FUELS

| Fuel | 1 | 2 | 3 | 4 |
|---|---|---|---|---|
| Bicyclic Aromatics content, Vol. Percent | 3.7 | <0.2 | 3.6 | <0.5 |
| Total Aromatics, Vol. Percent | 23 | 23 | 24 | 24 |
| Aromatics Boiling Range, °F | 330–550 | 330–400 | 330–475 | 360–600 |
| Aromatics Boiling above 400° F., Vol. Percent | 13 | 0 | 13 | 16 |
| Carbon Deposition in single combustor, grams | 74 | 19 | 51 | 16 |
| Carbon Deposition in full scale engine | Fail | Pass | [1] Fail | [1] Pass |

[1] Determined by correlation of single combustor results with results from full scale engine tests.

From this table it is clearly apparent that jet fuels containing less than 0.5 per cent of condensed ring aromatics possess satisfactory carbon-deposition characteristics. It is equally apparent that fuels containing more than 3 per cent of these hydrocarbons are unsatisfactory in this respect. It will also be noted that jet fuels containing as much as 24 volume per cent aromatics are satisfactory, providing these aromatics are predominately of the single ring type.

The effectiveness of $C_8$ and $C_9$ aromatics in reducing the filter plugging tendencies of fuels is shown by tests carried out on a water saturated jet fuel containing various amounts of these hydrocarbons. The fuel employed was a fuel meeting the JP-3 specifications. The fuel was filtered at −50° F. through a 10 micron filter at a rate of 75 cc./minute/square inch of filter area. This rate was selected to simulate full scale practice. The length of time required to plug the filter was then determined in each case. The results of these tests are given in the following Table 5.

*Table 5*

EFFECT OF ALKYLBENZENES ON LOW TEMPERATURE FILTERABILITY OF JP-3 JET FUEL

| Added Aromatic | Time to Plug Filter, Minutes [1] | | | | | |
|---|---|---|---|---|---|---|
| | Vol. Percent Added Aromatic in Blend | | | | | |
| | 0.0 | 0.25 | 0.5 | 1.0 | 3.0 | 10.0 |
| Toluene | | | | 18 | | 9 |
| Xylene | | 40 | N. P. | N. P. | N. P. | |
| Ethylbenzene | | | 68 | N. P. | | |
| Isopropyl benzene | 5 | | 45 | N. P. | | |
| Trimethyl benzene | | | 90 | N. P. | | |
| Sec.-butyl benzene | | | | 48 | | |
| Triethyl benzene | | | | 18 | | |
| Benzene | | | | 5 | | |

[1] N. P. signifies no plugging occurred in a 100 minute run.

It will be noted that when 1.0% of $C_8$ or $C_9$ aromatic was added to the jet fuel, no plugging of the filter occurred, while plugging did take place in those cases where $C_6$, $C_7$, $C_{10}$, or $C_{12}$ aromatics were added. It will also be noted that increasing the amount of $C_7$ to 10% actually impaired the ability of this material to inhibit plugging caused by ice formation. The following $C_8$ and $C_9$ aromatics are effective in reducing fuel filter plugging due to crystallization of water that may be contained in these fuels: ethyl benzene, ortho-, meta-, and para-xylenes, mesitylene, psuedo-cumene, hemi-mellitene, ortho-, meta-, and para-ethyl toluenes, cumene, n-propyl-benzene, styrene, ortho-, meta-, and para-vinyl toluenes. Of the foregoing, the di- and tri- substituted benzene compounds are preferred. The para compounds, having higher melting points than the ortho- and meta-compounds, are less preferred than the latter two types, other conditions being equal.

Other materials such as alcohols and glycols when added to a jet fuel will prevent the crystallization of dissolved water, but these materials unlike $C_8$ or $C_9$ aromatics can be leached from the fuel by contact with water. The advantage of using $C_8$ and $C_9$ aromatics for this purpose is particularly striking when it is considered that many fuel dispensing systems employ water as a displacing fluid. Of the $C_8$ aromatics, ortho-xylene has the highest boiling-point, 291.95° F. Of the $C_9$ aromatics, only pseudo-cumene and hemimellitene boil above 335° F.

The present invention may be best described and understood by reference to the attached drawings, in which Fig. 1 illustrates a method for producing hydrocarbon fuels containing limited amounts of polycyclic aromatics and any desired amount of single ring aromatics, Fig. 2 illustrates a preferred method for producing such fuels by treating selected fractions of hydrocarbon feed stocks, and Fig. 3 illustrates a procedure for simultaneously producing automotive and jet fuels from a common feed stock.

Referring specifically to Fig. 1, the apparatus depicted consists of a dearomatization zone 2 and a fractionation zone 7. A mixture of petroleum hydrocarbons boiling within the range of 100° F. to 600° F. and containing substantial amounts of polycyclic aromatics flows through line 1 into dearomatization zone 2. As mentioned earlier, the feed stock employed in this process may consist of virgin or cracked hydrocarbons. A mixture of these hydrocarbon types may be employed, but in general it is conventional in commercial operations to employ either the one or the other alone. In the dearomatization zone 2 the feed stock is treated by conventional refining methods to remove primarily polycyclic aromatic hydrocarbons. The degree of treatment is such that the refined fuel eventually produced by this process contains less than 5% by volume of polycyclic aromatics and preferably less than 2%. Conventional methods such as solvent extraction, percolation through adsorbents like silica gel, extractive distillation, combined solvent extraction and distillation steps, hydrogenation, etc. may be employed in the dearomatization step. It is particularly contemplated that a solvent extraction method be employed. Suitable solvents for this purpose include sulfur dioxide, furfural, phenol, nitrated hydrocarbons, oxygenated hydrocarbons such as glycols, and the like. It is important in the present invention to control the solvent extraction conditions such as the temperature, the amount of solvent and other factors to reduce the condensed ring aromatics content of the feed stock to the desired degree. A satisfactory procedure for the dearomatization step consists in treating the hydrocarbon feed with from 50 to 500 vol. percent of liquid sulfur dioxide at about 20° F.

Spectroscopic, chromatographic or chemical methods may be employed to make certain that undesirable amounts of condensed ring aromatics are avoided in the product fuel. One convenient method for insuring removal of the condensed ring aromatics is to employ the specific dispersion properties of the hydrocarbon mixture as a measure of the amount of extraction necessary. Such a method is described in detail in the Tongberg Patent, U. S. 2,304,289. The specific dispersion property of a liquid is a value expressing the difference in refractive index of two different wave lengths divided by the density of the liquid. It may be expressed by the formula, $$\frac{N_F - N_C}{d} \times 10^4$$

where $N_F$ is the refractive index at one wave length, $N_C$ is the refractive index at another wave length and $d$ is the density of the liquid. (See for example "Science of Petroleum," vol. 2, page 1174, published by Oxford University Press of London, New York, and Toronto: also Ward and Kurtz, "Journal of Industrial and Engineering Chemistry," analytical edition, 1939, page 559.) All of the condensed ring aromatics normally present in hydrocarbon fractions have a value as determined by the equation above 200, when determined according to a method used by Ward and Kurtz whereas the single ring aromatics have values below 189 and above 100 and the naphthenes and paraffins have values of 100 or less. By controlling conditions under which the solvent extraction is carried out, so that a limited amount of constituents in the raffinate have a specific dispersion above 200, it is possible to limit the condensed ring aromatics which are the objectionable constituents, while at the same time retaining in the raffinate the simple uncondensed aromatics many of which can be used to advantage.

In practical operations it is not possible to obtain a sharp division between the condensed and uncondensed ring aromatics. However, by controlling the degree of extraction, so that limited amounts of constituents in the extracted kerosene have specific dispersions above 200, the necessary amounts of condensed ring constituents can be removed while retaining within the raffinate a considerable amount of single ring aromatics.

Flowing from the dearomatization zone in line 3 is a stream rich in polycyclic aromatics. This stream may be withdrawn directly as a product through line 3 and may be employed in the manufacture of wood preservatives, solvents, plasticizers, carbon black, etc. Alternatively, where the stream in line 3 contains substantial amounts of single ring aromatics, it may be diverted through line 9 into fractionation zone 7. In this connection, it will be noted that the hydrocarbon feed stock employed in the general process may be completely dearomatized in zone 2, in which case the product in line 3 would be rich in single ring aromatic hydrocarbons, as well as polycyclic aromatic hydrocarbons. In any event, it is desirable to recover any single ring aromatics that may be present in this stream for incorporation in an automotive or jet fuel since these types of aromatics can be used to advantage in these fuels as described earlier.

In fractionation zone 7, the single ring aromatics are separated from the polycyclic aromatics, are withdrawn through line 10, and are blended with the dearomatized stream flowing in line 4 from zone 2. Polycyclic aromatics are withdrawn from zone 7 through line 11 as a residue or through lines 21 as one or more sidestreams depending upon their boiling points relative to the boiling points of the single ring aromatics. The separation of single ring aromatics from polycyclic aromatics in fractionation zone 7 may be achieved by any of the conventional refining procedures that are employed for this purpose. Such procedures include distillation, crystallization and solvent extraction. Distillation is a preferred means for carrying out this separation.

The dearomatized stream in line 4 may be augmented with additional amounts of single ring aromatics including alkylated aromatics flowing through line 5. In those cases where an automotive fuel is being produced by this process the aromatics in line 5 are preferably those boiling in the gasoline boiling range, i. e. from 176 to 450° F. In those cases where jet fuels are being produced, the aromatics in line 5 preferably boil within the jet fuel boiling range, for example from 176 to about 600° F. In the latter instance it is particularly contemplated that sufficient $C_8$ through $C_9$ aromatics be incorporated in a jet fuel at this point to produce a final product containing at least 0.5 vol. percent of these materials. As described earlier, it is essential that a jet fuel contain at least this amount of $C_8$–$C_9$ aromatics to preclude ice formation in such a fuel at low temperatures. In an example according to the process of Fig. 1, an extract was obtained from a kerosene distillate by treatment with liquid $SO_2$ as in zone 2. The extract had 23.6 API gravity, 327° F. initial boiling point, and 550° F. final boiling point. It contained 18% condensed ring aromatics as determined by ultraviolet spectra. It was distilled as in zone 7, and a residue of 4% was withdrawn as in line 11 of Fig. 1. The distillate recovered as in line 10 had 24.5 API gravity, 530° F. final boiling point and only about 14% condensed ring aromatics, indicating that the residue was substantially 100% bicyclic.

Other fuel components, such as anti-oxidants, ignition promoters, alkylate, propylene polymer, lead fluid, $C_4$ and $C_5$ hydrocarbons, solvent oil, alcohols and the like may be added to the refined fuel through line 6.

To summarize momentarily, a jet fuel containing less than 5 and preferably less than 2 vol. percent of polycyclic aromatics, at least 0.5 vol. percent of $C_8$ and/or $C_9$ aromatics, and up to the maximum permissible amounts of single ring aromatics, as stated in jet fuel specifications, may be produced by the present process. Such a fuel has excellent combustion characteristics and low carbonization and filter plugging tendencies. In a like manner, a gasoline or automotive fuel containing less than 5 vol. percent of polycyclic aromatic hydrocarbons and any desired amount of single ring aromatics may be produced by this process. Such a fuel may possess excellent anti-knock qualities, and yet not manifest any undesirable deposit forming tendencies in an automotive engine.

Fig. 2 illustrates a preferred method for processing hydrocarbon feed stocks for the production of automotive and jet fuels. This process is a modification of the process described in Fig. 1, and is directed primarily toward the treating of selected fractions of any given feed stock. This embodiment of the present invention utilizes a fractionation zone 17, a dearomatization zone 2, a treating zone 15, and a second fractionation zone 7.

A hydrocarbon mixture boiling within the range of 100 to 600° F. and containing substantial amounts of polycyclic aromatic hydrocarbons flows through line 1 into fractionation zone 17, where it is separated into two fractions. A first fraction boiling above 350-375° F. is removed through line 12 into dearomatization zone 2. This fraction, inasmuch as it boils above 350° F., contains substantially all of the polycyclic aromatics present in the hydrocarbon feed stream in line 1. This fractionation procedure is particularly attractive, in that the volume of material to be treated in the dearomatization zone is kept at a minimum, thus permiting greater economy and efficiency of operation. Furthermore, the second fraction boiling up to about 375° F. which is removed from fractionation zone 17 through line 13, may be individually treated with greater economy and efficiency in any treating process to which it may be subjected. For example, where the feed stock to the fractionation zone is a mixture boiling in the gasoline range, it is conventionally desirable to hydroform or catalytically reform the light boiling fraction of such a feed to obtain a final fuel product having good anti-knock quality.

The higher boiling fraction flowing through line 12 is dearomatized wholly or partially in zone 2 according to one of the conventional methods described in the explanation of the process illustrated in Fig. 1. Further, as has also been described in explaining the process of Fig. 1, the stream flowing through line 3, which is rich in polycyclic aromatic hydrocarbons, may be handled in several ways. First, where the stream consists essentially of polycyclic aromatics, it may be desirable to withdraw the stream directly through line 8 for use in the production of various byproducts, such as wood preservatives, solvents, plasticizers, and the like. Second, where this stream contains single ring aromatics as well as polycyclic aromatics, it may be more desirable to pass the stream in line 3 through line 9 into fractionation zone 7 for the purpose of separating the single ring aromatics from the polycyclic type. As described earlier, this fractionation may be achieved by conventional means such as distillation, crystallization, or solvent extraction. Again, distillation is the preferred technique.

The single ring aromatics flow from fractionation zone 7 through line 10 and are blended with the dearomatized fraction from zone 2 in line 4. Polycyclic aromatics are withdrawn from fractionation zone 7 through lines 11 as residual or sidestream fractions.

The hydrocarbon fraction boiling below 375° F. which is withdrawn from fractionation zone 17 through line 13 may be directly blended with the dearomatized fraction from zone 2 at point 18. However, as mentioned earlier, it is preferable in the case where an automotive fuel is being produced to treat this light boiling fraction for the purpose of raising its octane number. Such treatment may be realized by passing this stream from line 13 through line 14, treating zone 15 and line 16. While a number of processes may be employed in zone 15 for increasing the octane rating of this fraction, it is particularly preferred that a hydroforming operation be employed at this point. A hydroforming catalyst comprising platinum metal or the oxides or sulfides of metals of the 5th, 6th, and 8th groups of the periodic table may be used. The oxides of molybdenum, chromium, tungsten, cobalt, and nickel (alone or in mixtures) impregnated on a carrier such as alumina, alumina gel, clay, etc. may be employed. The catalyst consisting of molybdenum oxide on such a carrier is particularly preferred. Operating temperatures of 800° F. to 1050° F. and pressures up to 500 p. s. i., particularly 200-225 p. s. i., may be employed. Hydrogen to the extent of 2000 to 5000 cu. ft. per bbl. of feed and feed rates of 0.1 to 2.5 vols. of feed per vol. of catalyst may be used. It is preferred that a fluid bed hydroformer be used for this process, but a fixed bed or moving bed type of operation may also be employed. The hydroformed product from zone 15 flows through lines 16 and 13 and mixes with the dearomatized product from zone 2 at point 18.

Additional amounts of single ring aromatic hydrocarbons may be added to the two treated fractions just described at point 19. Where the fuel being processed according to this invention falls within the gasoline boiling range, it is particularly contemplated that the single ring aromatics added in this manner also fall within the same boiling range, namely about 175 to 450° F. Where the fuel being processed is a jet fuel, it is particularly contemplated that the single ring aromatics in this instance boil within the jet fuel boiling range. In this latter instance, it is further contemplated that the fuel produced by this process contain no less than 0.5 vol. percent, and preferably at least 2 vol. percent of $C_8$ through $C_9$ alkylated aromatics, or of $C_8$ alkylated aromatics alone, or of $C_9$ alkylated aromatics alone.

Additional fuel components such as alkylate, propylene polymer, and others listed in describing the process of Fig. 1 may be added through line 6 to the final fuel blend in line 4. The automotive and jet fuels produced by the process illustrated in Fig. 2 are characterized by the same critical composition limitations as the corresponding products produced by the process illustrated in Fig. 1.

A third embodiment of the present invention is illustrated in Fig. 3, in which a hydrocarbon mixture feed is processed to form an automotive fuel and a jet fuel having the compositions described above. The apparatus employed and illustrated in this figure consists of a fractionation zone 11, a light ends recovery and fractionation zone 21, cracking zones 37, 40, and 50, a dearomatization zone 28, hydroformers 24 and 71, and fractionation zones 25 and 32.

A petroleum feed stock containing hydrocarbons which boil in the gasoline and jet fuel boiling ranges flows through line 10 to fractionation zone 11, where it is fractionated to form any desired number of petroleum fractions having any desired boiling range characteristics. This fractionation zone is depicted for simplicity as a single tower; in actual practice it may consist of two or more distillation towers operating at various pressures. The exact manner of operating this zone will depend largely upon the characteristics of the products that it is desired to produce. For example in the case where JP-3 type jet fuel is desired, it is very probable that the boiling ranges of the fractions withdrawn from this zone will differ materially from the boiling ranges of the same fractions withdrawn in the production of a jet fuel of the JP-4 type. For the sake of illustration, it will be assumed that the apparatus is being used to produce jet fuel meeting the JP-4 specification and an automotive gasoline having the characteristics defined in U. S. Federal specifications for motor gasoline having an end-point below 450° F. and a fifty per cent point below 276° F. by the test method of ASTM specification D 86-30. It will further be assumed that petroleum crude oil is being employed as the feed stock.

According to the drawing, a crude oil is fractionated at cut points of vapor temperatures in zone 11 suitable to produce the following fractions with their indicated ASTM distillation ranges: an overhead of about 280° F. end point, a heavy naphtha boiling between 280° and 350° F., a kerosene boiling between 330° F. and 550° F., a 450° F. to 600° F. light gas oil, a 500° F. to 750° F. heavy gas oil, and a residuum. It will be noted that there is usually a considerable degree of overlap in the indicated ASTM boiling ranges of the various fractions produced. Such overlapping is usual because the degree of fractionation differs in the commercial refinery columns and in the ASTM test, and because it is extremely difficult to separate a mixture of hydrocarbons at a precise temperature. Gas and the light naphtha fraction (280° F. end point) pass overhead through line 12 to a light ends recovery and fractionation zone 21, which is illustrated as a single unit although it may consist of a battery of fractionating or stabilizing units for the separate removal of C₃, C₄, and C₅ hydrocarbons. Uncondensed gases comprising largely methane, ethane, and propane pass overhead from this zone through line 18. A C₄ fraction taken off through line 33 may be incorporated into the jet fuel product by passing it through lines 81 and 82, or it may be diverted, entirely or partially, through line 34 for incorporation in the automotive gasoline in line 115. A C₅ fraction removed through line 19 likewise may be incorporated (1) in the jet fuel by passage through lines 81 and 82, or (2) in the gasoline by passage through lines 35 and 115. The exact amount of the C₅ fraction employed in either blend will be governed largely by the volatility characteristics desired in each case.

A light naphtha fraction is removed from the light ends unit through line 20. This fraction may pass directly into the jet fuel blend through lines 72, 73, 81, and 82, or directly into the gasoline blend by passage through the lines 72, 73, 36, and 115. Where it is desired to increase the octane number of this fraction it may be subjected entirely or in part to a hydroforming operation 71. A conventional hydroforming unit may be employed for this purpose. A hydroforming catalyst comprising platinum metal or the oxides or sulfides of metals of the 5th, 6th, and 8th groups of the periodic table may be used. The oxides of molybdenum, chromium, tungsten, cobalt, and nickel (alone or in mixtures) impregnated on a carrier such as alumina, alumina gel, clay, etc. are especially preferred. Operating temperatures of 800° F. to 1050° F. and pressures up to 500 p. s. i., particularly 200 to 225 p. s. i., may be employed. Hydrogen to the extent of 2000 to 5000 cu. ft. per barrel of feed and feed rates of 0.1 to 2.1 vols. of feed per vol. of catalyst may be employed. The hydroformed naphtha product may be passed into the jet fuel through lines 73, 81 and 82, or into the automotive fuel through line 36 and line 115.

A heavy naphtha fraction, boiling between about 280° and 350° F. by ASTM distillation method of test, flows from fractionation zone 11 through line 13. This fraction may be incorporated directly in the jet fuel product through lines 22, 81 and 82, if it contains a sufficient amount of C₈ through C₉ aromatics. For the purposes of this invention, the final turbo jet aviation fuel blend must preferably contain a minimum of from 0.5 to 2.0 vol. percent of these constituents. Where the heavy naphtha fraction does not contain a sufficient amount of C₈ and C₉ aromatics, it is fed to a hydroforming operation 24. Again a conventional hydroforming unit employing the operating conditions described above may be employed. The purpose of this operation is twofold. First, it is employed to increase the octane number of this fraction where it is intended that it be used in the automotive fuel produced by this process. In this connection, paraffin-type hydrocarbons are converted to higher octane number aromatics and olefins while naphthene-type hydrocarbons are converted to high octane number aromatics. Second, where it is intended that the heavy naphtha fraction be incorporated in a turbo-jet fuel, the primary purpose of this operation is to produce C₈ and C₉ aromatics which, as has been already pointed out, greatly lessen the fuel filter plugging tendencies of jet fuels when they are incorporated therein.

The products from the hydroforming operation are passed through line 83 to fractionation zone 25. Any uncondensed gases are removed through line 26 and the hydroformed heavy naphtha, free of residue 99, is incorporated in the jet fuel by passing it through lines 27, 81, and 82. Where it is desired to use all or part of this fraction in the production of automotive gasoline, it may be bypassed entirely or partially through line 75 into line 115.

A kerosene fraction boiling between 350° and 550° F. flows from fractionating tower 11 through line 14. The aromatic hydrocarbons present in this fraction contain a large proportion of the condensed ring type. Since this fraction represents one of the major constituents of the jet fuel produced by this process, it is essential that a substantial portion of the condensed ring aromatics contained therein be removed. These aromatics can be removed by a number of conventional methods in dearomatization zone 28, as has been described earlier in explaining the process illustrated in Figs. 1 and 2. Further methods for controlling and limiting the degree of dearomatization have also been previously described.

By use of the dearomatization zone 28 it is possible to produce a jet fuel kerosene fraction that contains critically limited amounts of polycyclic aromatics as well as a byproduct fraction rich in such hydrocarbons. This byproduct fraction is removed through line 29 and may be employed in the manufacture of solvents, plasticizers, and the like. It is also contemplated that this fraction may be hydrogenated to form naphthenes which are suitable for inclusion in a jet fuel. Such hydrogenation can be carried out by passing the extract fraction through line 90 into hydrogenation zone 91. Here this material can be hydrogenated using conventional catalysts and hydrogenation conditions. Suitable catalysts include the metals of the 6th and 8th groups of the periodic table, their oxides and sulfides. Operating pressures of 200–500 p. s. i., temperatures of 200° to 700° F., and hydrogen consumptions of 200 to 2000 cu. ft. per barrel of feed may be employed. From zone 91 the hydrogenated product passes through lines 92 and 82 for inclusion in jet fuel.

It will also be noted that the entire kerosene fraction in line 14 may be subjected to a hydrogenation treat in equipment like that of zone 91 in dearomatization zone 28 in order to convert bicyclic aromatics to naphthenes. In this event operating conditions and catalysts of the type described above may be used. In view of the fact that the naphthenes produced by hydrogenating the corresponding aromatics have lower boiling points than the aromatics from which they are formed, it is possible in this instance to withdraw a kerosene fraction from zone 11 having a final boiling point somewhat in excess of 550° F. The dearomatized product from zone 28 may be included directly in the jet fuel product by passage through lines 30, 60, 81, and 82. Alternatively, it may be passed through lines 30 and 31 into fractionation zone 32, in which hydrocarbons falling within the gasoline boiling range may be separated from the higher boiling constituents and withdrawn through line 102. This overhead fraction may be diverted entirely or partially through line 103 into the gasoline product flowing through line 115. It may also be incorporated within the jet fuel product along with the heavy boiling constituents of the dearomatized stream which are withdrawn from fractionation zone 32 through line 101.

It will be noted at this time that additional amounts of C₈ and/or C₉ alkylated aromatics may be added to the final jet fuel product through line 77 in order to make certain that this product contains the critical amounts of these compounds necessary to overcome the fuel filter plugging problem described earlier. In addition, other materials such as ignition promoters, alkylate, propylene polymer, C₄ and C₅ fractions, anti-oxidants, lead fluid and the like may be added for various purposes to the automotive gasoline or jet fuel products.

In summary, a jet fuel is produced in line 82 by blending various fractions such as butanes, pentanes, light naphtha, heavy naphtha, heavy hydroformate, light hydroformate, kerosene, etc. in line 81. For example, a jet fuel of the JP-3 type may be obtained by blending the following hydrocarbon fractions as produced by the present process in the proper amounts to meet the JP-3 volatility specifica- (1) A closely fractionated $C_4$–$C_5$ fraction.
(2) A virgin naptha boiling from about 120 to 400° F.
(3) A heavy hydroformate or a heavy catalytic naphtha rich in $C_8$–$C_9$ aromatics and boiling from 250° F. to 400° F.
(4) A kerosene fraction boiling from about 400 to 600° F. and containing limited amounts of polycyclic aromatics.

An automotive fuel is obtained by this process by blending $C_4$, $C_5$, light naphtha, and heavy naphtha fractions in line 115 in the proper amounts.

It will be noted that automotive fuels and jet fuels of boiling ranges other than those described above can be easily obtained by varying the boiling point characteristics of the light naphtha, heavy naphtha and kerosene fractions in zone 11. It is particularly contemplated that the light naphtha fraction in some instances may have a final boiling point in the range of 325° to 350° F., inasmuch as a fraction of this boiling range is often preferable to employ as a feedstock to the hydroforming operation in zone 71. It will be understood that the operations described above are merely illustrative of a manner in which the present invention may be carried out. There are many obvious variations and modifications that may be employed without departing from the scope of the appended claims.

As illustrated in the drawing, light gas oil, heavy gas oil and residual fractions may be withdrawn from zone 11 through lines 15, 16, and 17. The light gas oil, heavy gas oil, and residual fractions may be sent directly to storage tanks through lines 39, 42, and 52, or may be cracked by conventional thermal or catalytic processes in zones 37, 40, and 50. The cracked products from these zones may then be sent separately or together to distillation units for subsequent fractionation into desired products. It is also contemplated that these cracked stocks may be used separately or together as part or all of the feed to tower 11.

It is apparent that where a jet fuel boiling up to about 600° F. is required, all or a part of the light gas oil fraction boiling from 450°–600° F. can be dearomatized in the same manner as the kerosene fraction and then incorporated in the jet fuel product. Alternatively, a kerosene fraction boiling up to about 600° F. can be removed from zone 11 and processed in the manner already described.

In summary, the present invention describes a method for obtaining fuels of high quality and high aromatic content which manifest a markedly decreased tendency toward forming sludge and varnish in automotive engines and deposits in the combustion chambers of automotive and jet engines. It will be noted that both jet fuels and automotive fuels having the desirable characteristics described above may be produced simultaneously from suitable feed stocks by employing the principles of this invention. In this connection, feed stocks such as petroleum crude oils, virgin gas oils, kerosenes, residual oils, the products of cracking operations, and the like may be employed.

The present invention describes a method for producing jet fuels containing $C_8$ through $C_9$ aromatics and limited amounts of condensed ring aromatics. It further constitutes a method for producing automative gasolines possessing high octane ratings and limited amounts of condensed ring aromatics. By limiting the amounts of condensed ring aromatics in jet fuels and automotive fuels, the carbonizing and deposit forming tendencies of these fuels are greatly reduced. By incorporating alkylated single ring aromatics and in particular those containing 8 or 9 carbon atoms in jet fuels, the filter plugging tendencies of these fuels due to ice formation can be substantially eliminated. By incorporating single ring aromatic hydrocarbons in automotive fuels, it is possible to produce gasolines of high anti-knock quality without encountering any serious degree of engine deposits.

Table 6 lists some of the physical properties of the fuels shown in Table 4.

Table 6

PHYSICAL PROPERTIES OF FUELS SHOWN IN TABLE IV

| Fuel | 1 | 2 | 3 | 4 |
|---|---|---|---|---|
| API gravity | 46.6 | 51.0 | 46.6 | 45 |
| Distillation (Percent Evaporation) ° F.: | | | | |
| IBP | 102 | 106 | 119 | 134 |
| 10% | 165 | 185 | 249 | 192 |
| 50% | 336 | 316 | 381 | 483 |
| 90% | 480 | 452 | 453 | 572 |
| FBP | 523 | 507 | 500 | 600 |
| Sulfur, wt. percent | 0.4 | 0.2 | 0.2 | |
| Freezing Pt., ° F | <−76 | <−76 | <−76 | |
| Viscosity at −40° F., cs | 3.2 | 2.8 | 3.8 | |

What is claimed is:

1. Process for refining a hydrocarbon fuel containing monocyclic and polycyclic aromatics and boiling between about 100° F. and 600° F. which comprises dearomatizing said fuel to remove polycyclic aromatic hydrocarbons, blending the dearomatized fuel with sufficient single ring aromatic hydrocarbons including alkylated single ring aromatics containing from 8 to 9 carbon atoms to produce a refined fuel containing less than 5 per cent by volume of polycyclic aromatics at least 0.5 volume percent of an alkylated $C_8$–$C_9$ aromatic hydrocarbon and a total of from 0.5 to 25 per cent by volume of single ring aromatic hydrocarbons.

2. In a process for making fuels for jet-propelled aircraft, the improvement which comprises dearomatizing a hydrocarbon mixture containing monocyclic and polycyclic aromatics and boiling within the range of 100° F. to 600° F. to remove primarily polycyclic aromatics and blending the dearomatized mixture with an amount of an alkylated benzene compound containing a total of 8–9 carbon atoms to produce a fuel containing less than 3 volume per cent polycyclic aromatics and at least 2 volume per cent of said alkylated benzene.

3. Process as defined in claim 2 in which the hydrocarbon mixture is dearomatized by solvent extraction.

4. Process as defined in claim 2 in which the hydrocarbon mixture is dearomatized by contact with an adsorbent material capable of adsorbing aromatic hydrocarbons.

5. Process as defined in claim 2 in which the hydrocarbon mixture is dearomatized by extractive distillation.

6. Process as defined in claim 2 in which the fuel contains less than 1 volume per cent polycyclic aromatics.

7. Process for producing a hydrocarbon fuel which comprises fractionating a hydrocarbon mixture that contains monocyclic and polycyclic hydrocarbons and that boils within the range from about 100° F. to 600° F. to form a first fraction boiling below about 375° F. and a second fraction boiling above about 350° F., treating the second fraction to remove primarily polycyclic aromatic hydrocarbons from said second fraction, blending the treated fraction with said first fraction to obtain a composite fraction containing less than 5% by volume of polycyclic hydrocarbons, and incorporating an amount of an alkyl substituted benzene compound containing 8 to 9 carbon atoms within said composite fraction to produce a refined fuel containing at least 0.5% by volume of said alkyl substituted benzene.

8. Process for producing a hydrocarbon fuel which comprises dearomatizing a mixture of hydrocarbons containing polycyclic and monocyclic hydrocarbons and boiling within the range from about 100° F. to 600° F. to form a first dearomatized fraction and a second fraction rich in aromatics, selectively removing single ring aromatics from said second fraction, blending the single ring aromatics with the dearomatized fraction to provide a composite fraction containing less than 2% of polycyclic hydrocarbons and incorporating an amount of an alkyl substituted benzene containing a total of 8–9 carbon atoms within the composite fraction to produce a refined fuel containing at least 0.5 volume percent of said alkyl substituted benzene.

9. Process for producing a hydrocarbon fuel which comprises fractionating a hydrocarbon mixture containing monocyclic and polycyclic aromatics and boiling within the range of 100° F. to 600° F. to form a first fraction boiling below about 375° F., and a second fraction boiling above 350° F., dearomatizing said second fraction to remove primarily polycyclic hydrocarbons, blending the dearomatized second fraction with the first fraction to produce a refined fuel containing less than 5% by volume of polycyclic hydrocarbons, and maintaining within the refined fuel at least 0.5 volume per cent of an alkyl substituted aromatic hydrocarbon containing a total of 8 to 9 carbon atoms.

References Cited in the file of this patent

UNITED STATES PATENTS

| | | |
|---|---|---|
| 2,304,289 | Tongberg | Dec. 8, 1942 |
| 2,322,673 | Sweeney | June 22, 1943 |
| 2,342,888 | Nysewander et al. | Feb. 29, 1944 |
| 2,374,102 | Jahn et al. | Apr. 17, 1945 |
| 2,563,305 | Britton et al. | Aug. 7, 1951 |
| 2,593,561 | Herbst et al. | Apr. 22, 1952 |
| 2,630,405 | Fetterly | Mar. 3, 1953 |